United States Patent
St. Pierre et al.

(10) Patent No.: US 7,254,835 B2
(45) Date of Patent: Aug. 7, 2007

(54) METHOD AND APPARATUS FOR CONVEYING A SECURITY CONTEXT IN ADDRESSING INFORMATION

(75) Inventors: Robert P. St. Pierre, Sunnyvale, CA (US); Germano Caronni, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 917 days.

(21) Appl. No.: 10/037,800

(22) Filed: Jan. 4, 2002

(65) Prior Publication Data

US 2003/0131123 A1   Jul. 10, 2003

(51) Int. Cl.
G06F 9/00      (2006.01)
G06F 15/173    (2006.01)
H04L 12/28     (2006.01)

(52) U.S. Cl. .................. 726/14; 726/15; 709/238; 709/230; 370/408; 370/466

(58) Field of Classification Search ........ 713/200–201; 380/277; 726/14, 15; 709/238, 230; 370/409, 370/466
See application file for complete search history.

(56) References Cited

U.S. PATENT DOCUMENTS

| | | | |
|---|---|---|---|
| 6,055,575 A | 4/2000 | Paulsen et al. | 709/229 |
| 6,118,784 A * | 9/2000 | Tsuchiya et al. | 370/401 |
| 6,172,986 B1 * | 1/2001 | Watanuki et al. | 370/466 |
| 6,330,562 B1 * | 12/2001 | Boden et al. | 707/10 |
| 6,487,665 B1 * | 11/2002 | Andrews et al. | 726/26 |
| 6,798,782 B1 * | 9/2004 | Caronni et al. | 370/409 |
| 6,870,842 B1 * | 3/2005 | Caronni et al. | 370/390 |
| 6,938,169 B1 * | 8/2005 | Caronni et al. | 726/4 |
| 6,970,941 B1 * | 11/2005 | Caronni et al. | 709/238 |
| 6,977,929 B1 * | 12/2005 | Caronni et al. | 370/392 |
| 2002/0073215 A1 * | 6/2002 | Huitema et al. | 709/230 |
| 2002/0095603 A1 * | 7/2002 | Godwin et al. | 713/201 |
| 2002/0133608 A1 * | 9/2002 | Godwin et al. | 709/230 |
| 2002/0154635 A1 * | 10/2002 | Liu | 370/392 |

FOREIGN PATENT DOCUMENTS

| | | |
|---|---|---|
| EP | 1087575 A1 * | 3/2001 |
| WO | WO 99/38081 | 7/1999 |

OTHER PUBLICATIONS

R.A Woodburn and D.L. Mills University of Deleware Jul. 1991 Netwrok Working Group Request for Comments 1241.*

(Continued)

*Primary Examiner*—Emmanuel L. Moise
*Assistant Examiner*—Techane J. Gergiso
(74) *Attorney, Agent, or Firm*—Osha Liang LLP

(57) ABSTRACT

A method for conveying a security context, including creating and assigning a virtual address to a client process, issuing a first Internet Protocol version compliant packet wherein the first Internet Protocol version compliant packet comprises a security context, prepending an issued packet with a second Internet Protocol version header producing a second Internet Protocol version compliant packet, forwarding the second Internet Protocol version compliant packet to a recipient, stripping away the second Internet Protocol version compliant header from the second Internet Protocol version compliant packet producing a stripped packet at the recipient, decrypting and authenticating the stripped packet using a particular method as indicated by the security context producing a decrypted and authenticated packet, and routing the decrypted and authenticated packet to a recipient process using the virtual address.

14 Claims, 7 Drawing Sheets

OTHER PUBLICATIONS

Silvano Gai IPv6 The New Internet Protocol for Internet and Intranets Dec. 12, 1997 IPv6.com pp. 39-56, pp. 151-166.*

Mobile IPv6 solution based on Linux Netfilter framework Dai Gang; Ma Yan; Info-tech and Info-net, 2001. Proceedings. ICII 2001—Beijing. 2001 International Conferences on vol. 5, Oct. 29-Nov. 1, 2001 pp. 306-310 vol. 5.*

Gang et al (Mobile IPv6 solution based on Linux Netfilter framework Dai Gang; Ma Yan; Info-tech and Info-net, 2001. Proceedings. ICII 2001—Beijing. 2001 International Conferences on vol. 5, Oct. 29-Nov. 1, 2001 pp. 306-310 vol. 5).*

RFC2406.*

The Internet Protocol Journal vol. 2. Nov. 1 Mar. 1999. WWW. Cisco.com/ipj.*

The Internet Protocol Journal vol. 3. Nov. 1 Mar. 2000. WWW. Cisco.com/ipj.*

Germano Caronni, Sandeep Kumar, Christoph Schuba and Glenn Scott; "*Virtual Enterprise Networks: The Next Generation of Secure Enterprise Networking;*" ACSAC 2000; pp. 1-10; 16th Annual Computer Security Applications Conference; Sun Microsystems Laboratories.

*RFC 1812 Requirements for IP Version 4 Routers*; Jun. 1995; pp. 1-15; http://sunsite.dk/RFC/rfc/rfc1812.html.

S. Deering and R. Hinden: "*Internet Protocol, Version 6 (Ipv6) Specification;*" Dec. 1998; pp. 1-37; The Internet Society.

UK Combined Search Report dated May 23, 2003, 1 page.

* cited by examiner

METHOD AND APPARATUS FOR CONVEYING A SECURITY CONTEXT IN ADDRESSING INFORMATION

BACKGROUND OF INVENTION

Computers connected to a network must have a means to facilitate communication between themselves. One such means is the Internet Protocol (IP). As networks have evolved, the IP has been updated accordingly. Internet Protocol version 4 (IPv4) is the version that is currently used for network communication.

FIG. 1 illustrates an exemplary group of networks. A first network includes a first computer (2), a second computer (4), a third computer (6), and a first network printer (8), each including an interface, e.g., an Ethernet™ card, to connect to a first physical network (10) e.g., an Ethernet™. A second network includes a second network printer (14), a fourth computer (16), a fifth computer (18), and a storage server (23), each including an interface to connect to the second physical network (11). The first network and the second network are able to connect to a wide area network (22), such as the Internet, via the first router (12) and the second router (13), respectively.

Referring to FIG. 1, the devices connected to a network communicate using packets. As mentioned above, the contents of the packets are governed by the Internet Protocol.

FIG. 2 illustrates a typical IPv4 packet arrangement. The IPv4 packet includes the header (58) and the data (60), also known as a payload. The payload may be as large as 64 kilobytes, and must be at least 512 bytes. The header (58) includes one or more of the following: a version (30), an Internet header length (IHL) (32), a type of service (ToS) (34), a total length (36), an ID (38), a flag (40), a fragment offset (42), a time to live (TTL) (44), a protocol (46), a checksum (48), a source address (SA) (50), a destination address (DA) (52), an option (54), and a padding (56). The SA (50) is the IP address of the sender. The DA (52) is the IP address of the destination node. The SA is allocated 32 bits and the DA is allocated 32 bits. The IP address may be mapped to a physical machine address, also known as a media access control address (MAC address). The options (54) are up to 3 option fields for user-defined use. The options are allocated 16 bits.

The wide adoption of networks in the workplace has resulted in the creation of Supernets. A Supernet is a virtual network located on top of a pre-existing network. The Supernet appears as a single, private network, though the individual members may be spread across a multi-network, public infrastructure. The Supernet contains a set of processes that are denoted as nodes. FIG. 3 illustrates an exemplary Supernet located on top of the group of networks illustrated in FIG. 1. The Supernet (17) is located on top of the existing group of networks shown in FIG. 1. The Supernet (17) includes a first node (3) located on the first computer (2), a second node (5) and third node (7) located on the fifth computer (18), and a fourth node (9) located on the Storage server (23).

The Supernet includes an addressing structure and security services that protect data transmitted by the pre-existing network. Each Supernet contains a channel and a set of nodes. The Supernet is identified by a Supernet ID, and the channel is identified by a Channel ID. The channel is a communication abstraction that defines an association between Supernet members through a shared key. The shared key is used in conjunction with an encryption method, e.g., Data Encryption Standard (DES), etc., to ensure authentication and confidentiality of the communication abstractions by restricting access to group members with knowledge of the key. The channel is similar to a local network on the Internet. A node is a process running on a networked computer identified by an IP address within the Supernet. On a given computer there may be multiple nodes. The node can participate in multiple channels, but at most one Supernet.

Nodes can communicate with other nodes only if they belong to the same channel on the Supernet, i.e., they share the same key.

Supernets are typically implemented using IPv4 with additional dedicated headers for conveying security context, e.g., channel, node information, etc., or using a separate message exchange (e.g., IPSec IKE protocol). These Supernets typically run over a pre-existing network running IPv4. The aforementioned techniques typically require modification of the operating system upon which the node is running, such that the operating system can track the Supernet and the channel using the Supernet ID and channel ID, respectively.

SUMMARY OF INVENTION

In general, in one aspect, the invention relates to a method for conveying a security context, comprising creating and assigning a virtual address to a client process, issuing a first Internet Protocol version compliant packet, wherein the first Internet Protocol version compliant packet comprises a security context, prepending an issued packet with a second Internet Protocol version header producing a second Internet Protocol version compliant packet, forwarding the second Internet Protocol version compliant packet to a recipient, stripping away the second Internet Protocol version compliant header from the second Internet Protocol version compliant packet producing a stripped packet at the recipient, decrypting and authenticating the stripped packet using a particular method as indicated by the security context producing a decrypted and authenticated packet, and routing the decrypted and authenticated packet to a recipient process using the virtual address.

In general, in one aspect, the invention relates to a network system comprising an authentication server daemon that replies to a Supernet Attach Command, and a virtual address daemon that maintains a mapping of the Supernet configuration information performing the following steps: creating and assigning a virtual address to a client process, issuing a first Internet Protocol version compliant packet, wherein the first Internet Protocol version compliant packet comprises a security context, prepending an issued packet with a second Internet Protocol version header producing a second Internet Protocol version compliant packet, forwarding the second Internet Protocol version compliant packet to a recipient, stripping away the second Internet Protocol version compliant header from the second Internet Protocol version compliant packet producing a stripped packet at the recipient, decrypting and authenticating the stripped packet using a particular method as indicated by the security context producing a decrypted and authenticated packet, and routing the decrypted and authenticated packet to a recipient process using the virtual address.

In general, in one aspect, the invention relates to an apparatus for conveying a security context, comprising means for creating and assigning a virtual address to a client process, means for issuing a first Internet Protocol version compliant packet, wherein the first Internet Protocol version compliant packet comprises a security context, means for prepending an issued packet with a second Internet Protocol version header producing a second Internet Protocol version compliant packet, means for forwarding the second Internet Protocol version compliant packet to a recipient, means for stripping away the second Internet Protocol version compliant header from the second Internet Protocol version compliant packet producing a stripped packet at the recipient, means for decrypting and authenticating the stripped packet using a particular method as indicated by the security context producing a decrypted and authenticated packet, and means for routing the decrypted and authenticated packet to a recipient process using the virtual address.

Other aspects and advantages of the invention will be apparent from the following description and the appended claims.

DETAILED DESCRIPTION

Figure 1:
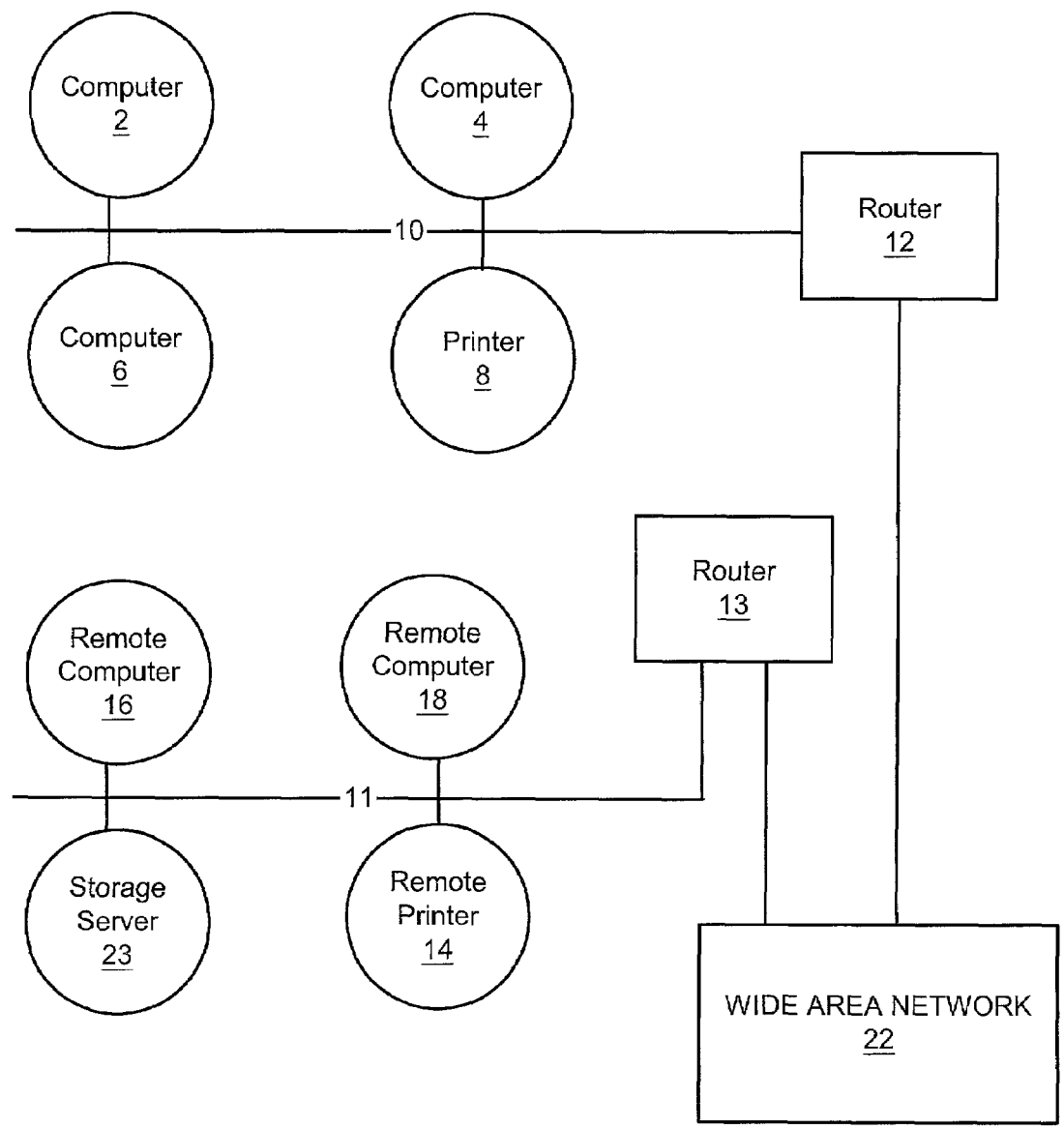
FIG. 1 illustrates a prior art group of networks.
Figure 2:
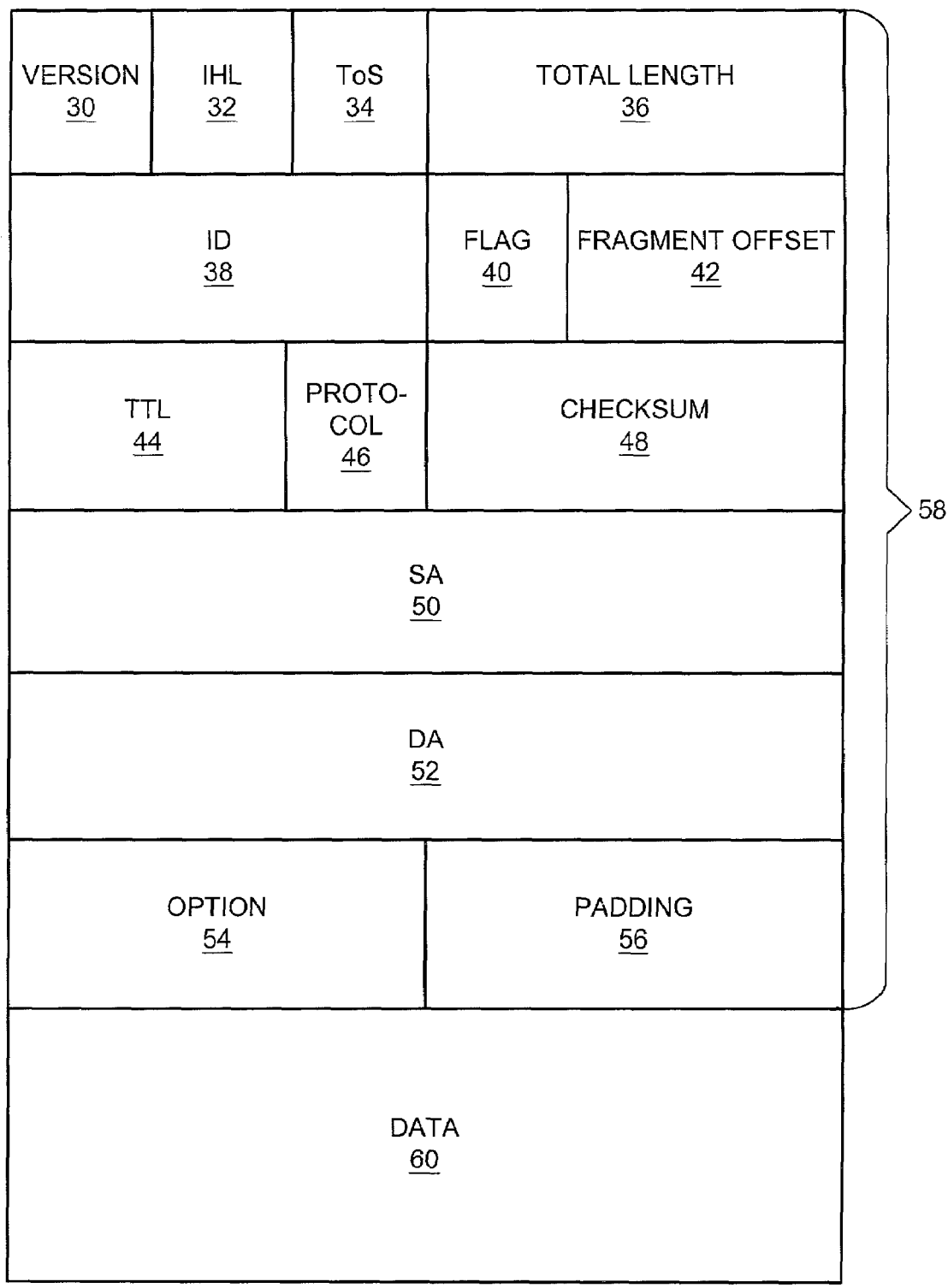
FIG. 2 illustrates a typical IPv4 packet arrangement.
Figure 3:
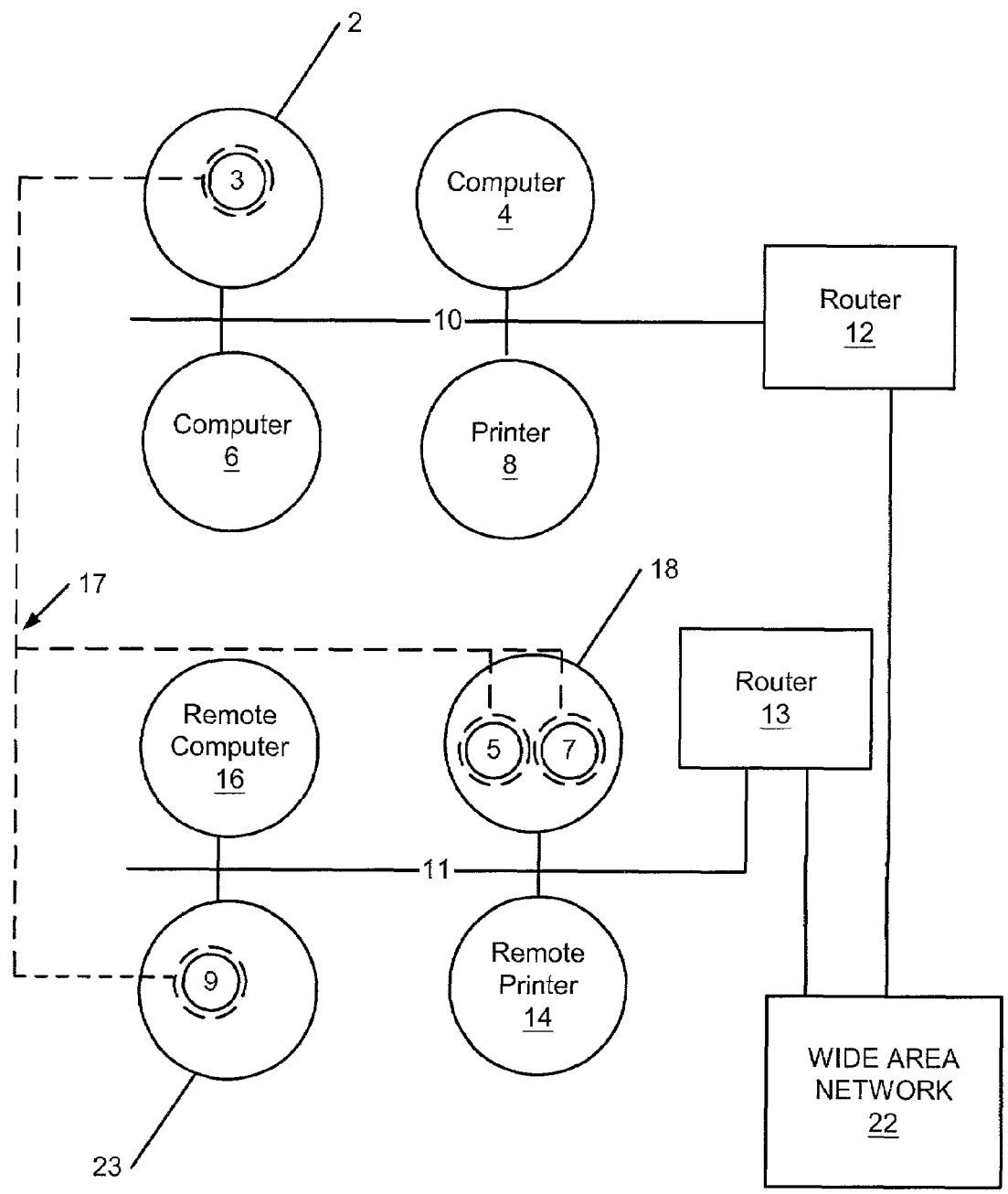
FIG. 3 illustrates a Supernet located on top of the group of networks illustrated in FIG. 1.

Specific embodiments of the invention will now be described in detail with reference to the accompanying figures. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present invention relates to a method for implementing a Supernet on a pre-existing IPv4 network. Further, the present invention relates to using IPv6 in conjunction with IPv4 to convey a security context within a packet.

The growth of the Internet is pushing current IP to its size limits and capacity. As a result, an Internet Engineering Task Force (IETF) formed IP version 6 (IPv6). IPv6 differs from IPv4 in its addressing capabilities, address notations, header formats, header extensions and options, and flow labeling capabilities. Detail regarding IPv6 that is outside the scope of the present invention may be found at "Request for Comments (RFC) 2460" entitled "Internet Protocol, Version 6 (IPv6) Specification" promulgated by IETF (www.ietf.org).

IPv6 uses 16 octets, or 128 bits, for addresses, as compared to 4 octets, or 32 bits, in IPv4. The increased number of octets allows IPv6 to provide trillions of possibilities for addresses. Additionally, IPv6 changes the address notation from periods (.) separating address elements, to colons (:). The header format has been modified in IPv6 in order to reduce overhead of the packet headers. Furthermore, IPv6 includes extensions to allow the protocol to be adapted to specialized information. In view of the present invention, this specialized information is the security context, i.e., Supernet ID, Channel ID, virtual address of the recipient.

Figure 4:
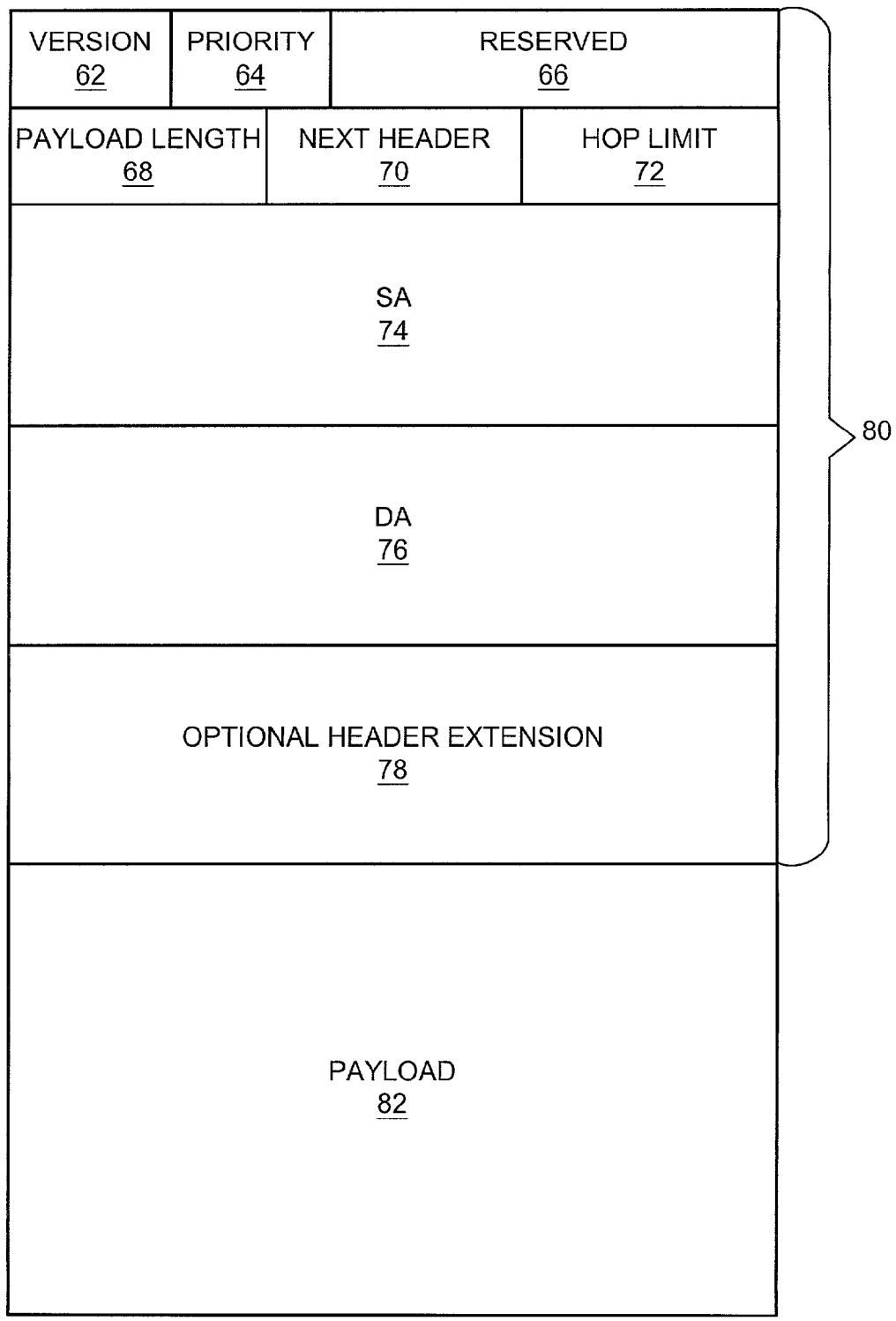
FIG. 4 illustrates a typical IPv6 packet arrangement.

FIG. 4 illustrates a typical IPv6 packet arrangement. Similar to the IPv4 packet, an IPv6 packet includes a header (80) and a payload (82). Between the header and the payload, the IPv6 packet includes the version (62), a priority (64), a reserved field (66), a payload length (68), a next header (70), a hop limit (72), an SA (74), a DA (76), and an optional header extension (78).

The next header (70) indicates the type of header that follows the IPv6 header. The value will determine whether there are any optional headers before the payload. The hop limit (72) is the maximum number of nodes through which the packet can be passed. Each node through which the packet passes will decrement the hop limit value by 1. If this value reaches 0 before the packet reaches its destination, the packet will be discarded. The SA (74) is a 128-bit field that contains the address of the packet's originator. The DA (76) is a 128-bit field that contains the address of the packet's intended recipient. The address is denoted with colons (:) separating address elements. The optional header extension (78) may contain headers in addition to the one provided by IPv6. The optional headers may be used to establish additional security for the packet.

In order to achieve packet security by conveying security association information in an IPv6 address, each communications process is assigned to a virtual network interface. The virtual network interface assigns both a virtual address for packet delivery and indicates the Supernet and channel where the IP address resides. The choice of Supernet and channel indicates which keying (encryption/decryption and authentication) material to use, and which type of address mapping to use in further stages of processing the packet.

Figure 5:
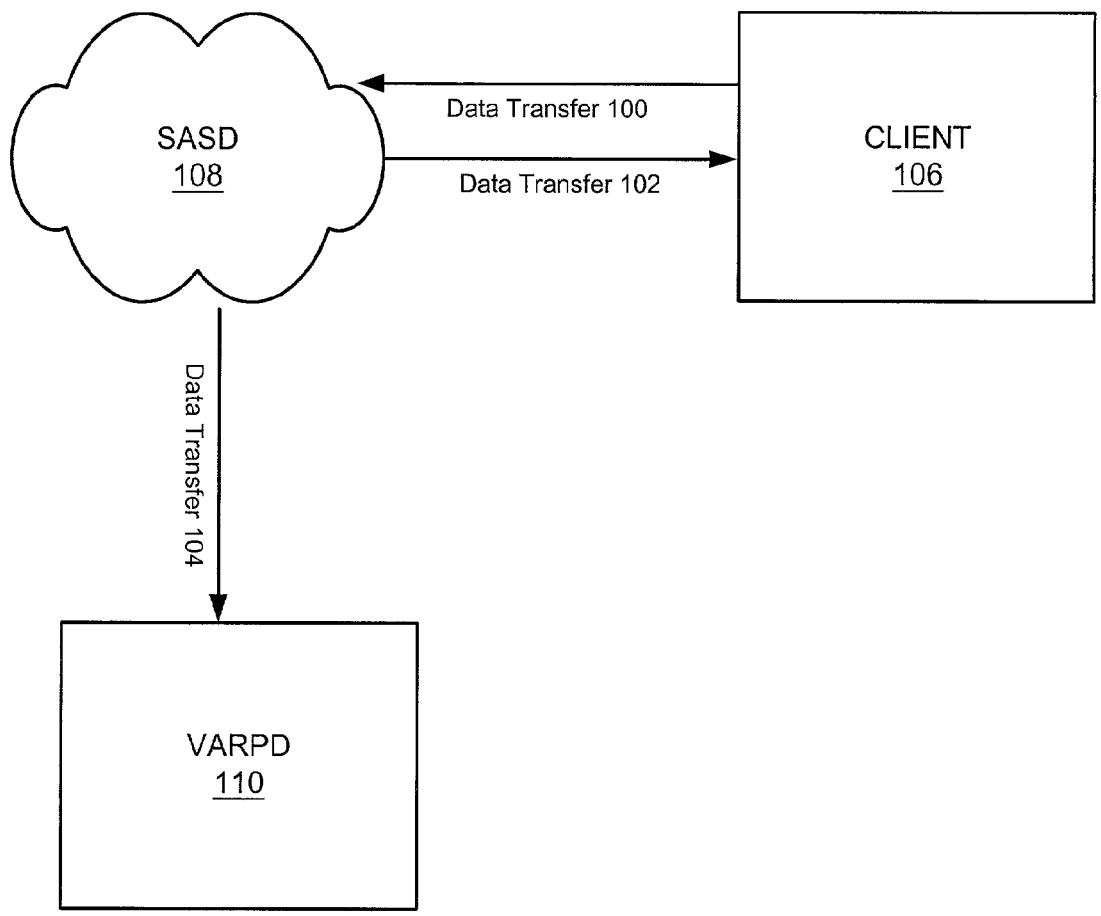
FIG. 5 illustrates a process used to assign a virtual address to a recipient in accordance with one embodiment of the invention.

FIG. 5 illustrates a process used to assign a virtual address of the recipient, in accordance with one embodiment of the invention. The virtual network interface includes a client (106), a Supernet authentication secure daemon (SASD) (108), and a virtual address resolution protocol daemon (VARPD) (110). To exchange addresses using the virtual network interface, the client (106) executes a "Supernet Attach" command (denoted as data transfer 100) to the SASD (108). The Supernet Attach command retrieves the virtual address of the recipient, i.e., IPv6 address of the recipient as well as the corresponding Supernet ID, and Channel ID. The SASD (108) responds by replying (denoted as data transfer 102) to the client (106) with the Supernet configuration information, which includes the IPv6 address containing an encoded security context, i.e., virtual address, of the recipient, Supernet ID, and Channel ID. The SASD (108) also registers the mapping of the IPv6 address information (denoted as data transfer 104) with the VARPD (110). The VARPD (110) maps the virtual address of the recipient within the Supernet to an actual IPv4 address on the network. For example, a computer on a network may be assigned an IP address of 63.207.206.001. If the computer is subsequently added to a Supernet, it will be assigned a virtual address, e.g., 10.0.0.100. VARPD (110) subsequently maps the virtual address, i.e., 10.0.0.100, to the actual address, i.e., 63.207.206.001.

The encoded security context of a 128-bit IPv6 address is a unique, proprietary address, such that the first 16 bits are set to a specific value that denotes a site local IPv6 address, as defined by the IPv6 protocol. The first 16 bits include 12 bits for a prefix at the beginning of the address that always have the value "0x feb". The next 4 bits each have a value of zero. The remaining 112 bits encode the Supernet ID, Channel ID, and the virtual address of the recipient.

In one or more embodiments of the present invention, the remaining 112 bits include 64 bits for the Supernet ID, 24 bits for the Channel ID, and 24 bits for the virtual address of the recipient in an IPv4 address format. The combination of the Supernet ID and Channel ID identifies the keying material for the encrypt/decrypt. The following example illustrates the aforementioned embodiment. Consider a recipient with a virtual IPv6 address of 10.0.0.1, a Supernet ID of 0x02, and a Channel ID of 0x03. The resulting 128-bit IPv6 address, in accordance with the aforementioned embodiment, is feb0:0000:0000:0000:0002:0000:0300:0001.

Those skilled in the art may recognize that the remaining 112 bits may be partitioned differently, so long as all nodes in a Supernet use the same partitioning scheme.

Figure 6:
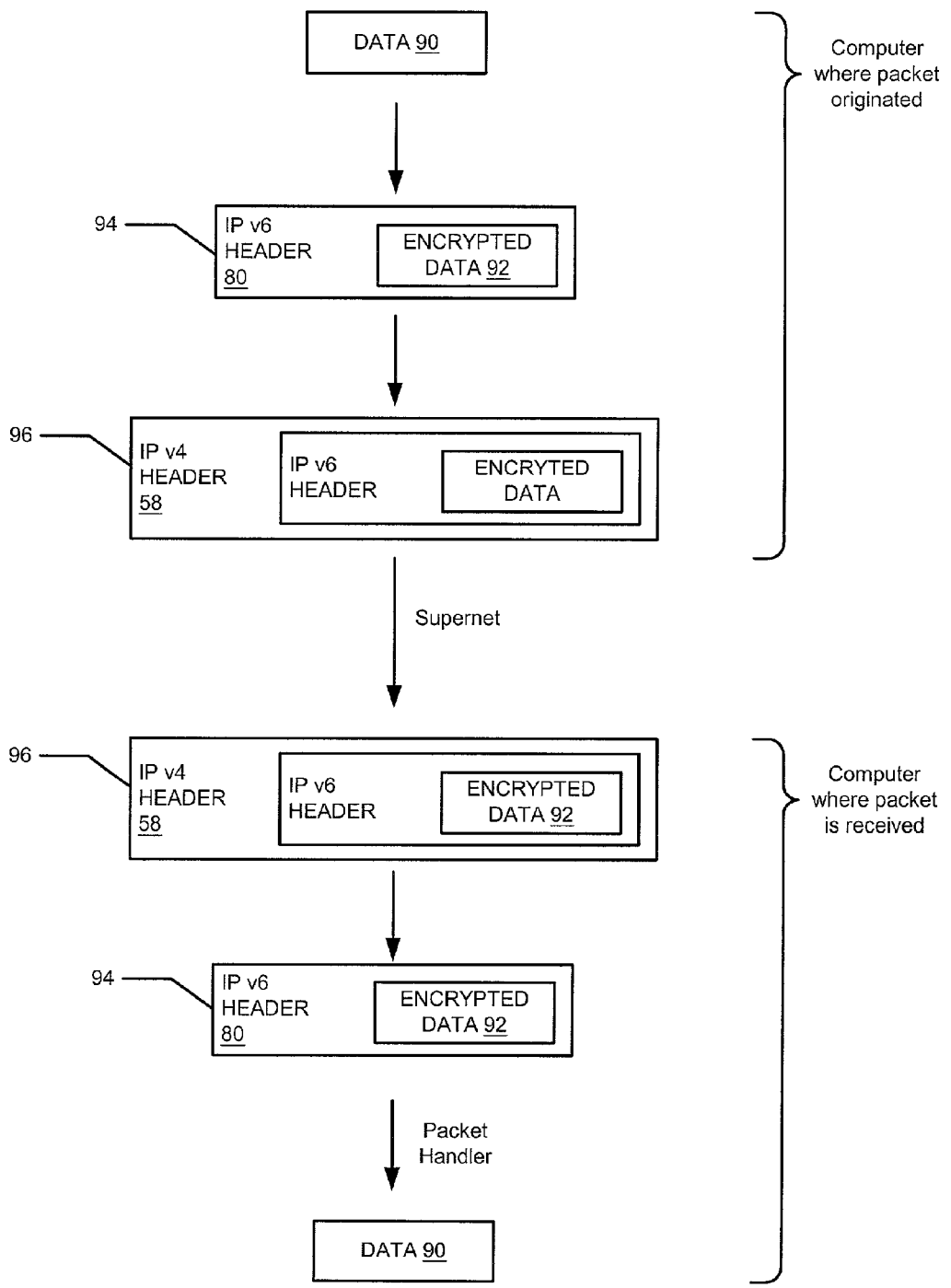
FIG. 6 illustrates an exemplary data flow diagram in accordance with one embodiment of the invention.

FIG. 6 illustrates an exemplary data flow diagram, in accordance with one embodiment of the invention, of the typical packet make-up at various stages during the transfer of data from a client to a recipient within a Supernet. Initially, data (90) that is to be sent is encrypted using the Channel ID and Supernet ID to produce encrypted data (92). The encrypted data (92) is subsequently prepended with an IPv6 header (80) to produce an IPv6 packet (94). The IPv6 packet is subsequently prepended with an IPv4 header (58) to produce an IPv4 packet (96). The IPv4 header (58) is used to route the data to a recipient computer. Once the IPv4 packet reaches the recipient computer, the IPv4 header (94) is stripped from the IPv4 packet (96) to produce the IPv6 packet (94). The Ipv6 packet (94) is then forwarded to a packet handler, such as Netfilter. Netfilter is a packet managing infrastructure provided by the Linux™ kernel. Those skilled in the art will appreciate that any packet management infrastructure may be used. The packet handler uses the 128-bit address embedded within the IPv6 header (80) to decrypt and authenticate the encrypted data (92). The data (90) is then forwarded to the appropriate process within the recipient computer.

Figure 7:
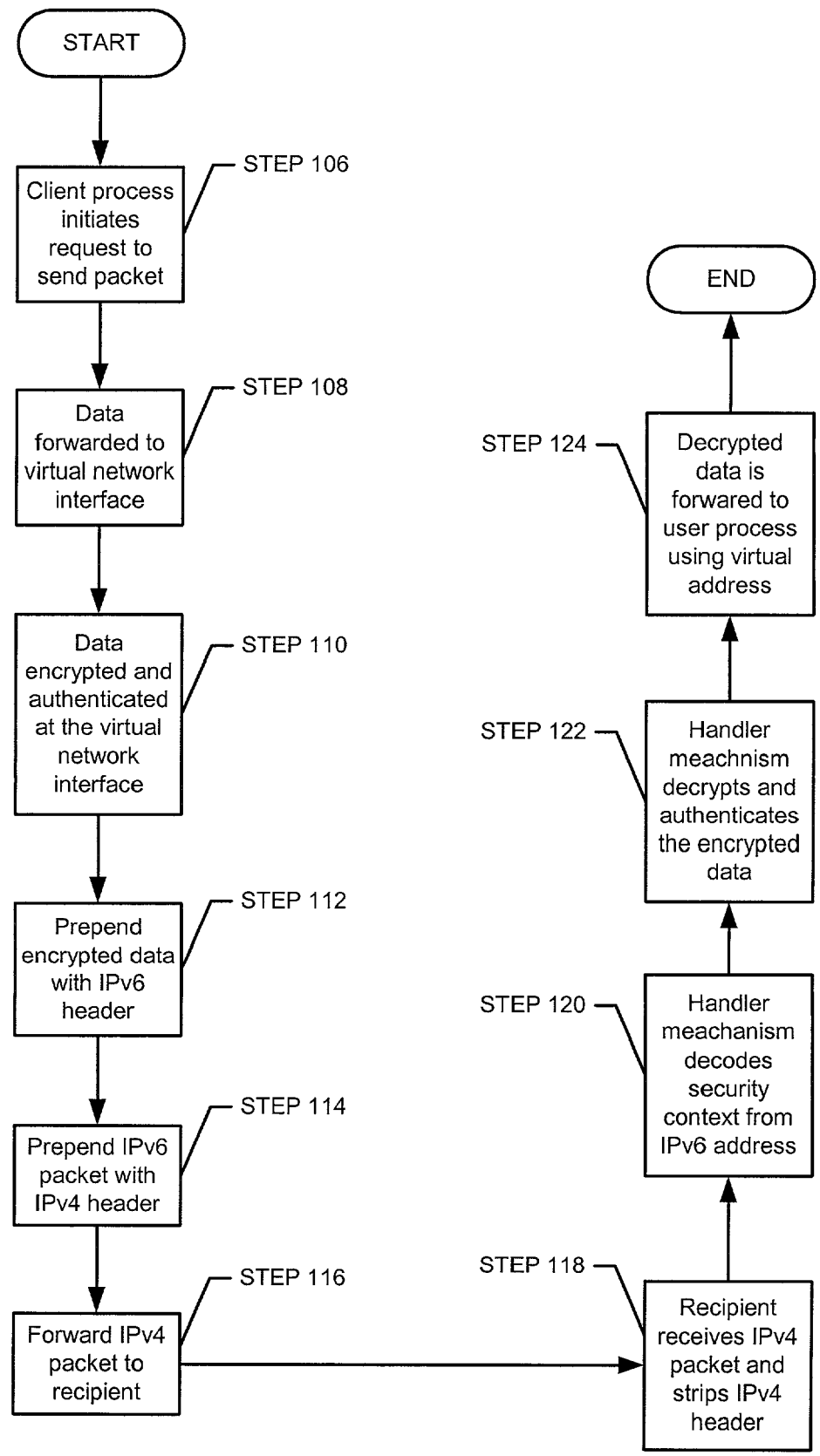
FIG. 7 illustrates an exemplary flow process in accordance with one embodiment of the invention.

FIG. 7 illustrates an exemplary flow process in accordance with one or more embodiments of the present invention. A client process initiates a request to send a packet to a recipient computer on a Supernet (Step 106). The client process forwards data, i.e., the payload (82 in FIG. 4), to a virtual network interface (Step 108). At the virtual network interface, encryption and authentication operations on the data are performed to produce encrypted data (Step 110). The virtual network interface subsequently prepends the encrypted data with an IPv6 header to produce an IPv6 packet (Step 112). The IPv6 packet is subsequently prepended with an IPv4 header (Step 114). The IPv4 packet is then forwarded to the recipient, as specified in the IPv4 header (Step 116).

The recipient receives the IPv4 packet and strips off the IPv4 header to produce the IPv6 packet (Step 118). A handler mechanism takes the IPv6 packet and decodes the security context, i.e., virtual address, Supernet ID and Channel ID (Step 120). Using the security context, the handler mechanism decrypts and authenticates the data within the payload portion of the packet (Step 122). Finally, the virtual address is used as the DA for routing the packet to a corresponding user process (Step 124).

While the invention has been discussed with respect to IPv6 encapsulated within IPv4, those skilled in the art will appreciate that the invention may be applied with any two versions of the IP. For example, the current state of the Internet Communication Architecture supports IPv4, thus, IPv6 is encapsulated with IPv4. However, as discussed above, IPv6 was created to handle the increased size requirements of the Internet. Thus, at some point, IPv6 will become the standard IP. When this occurs, other IPs such as IPv8 may be created that handle more security features than are currently available with IPv6. Those skilled in the art will appreciate that the principles of the invention may be applied such that IPv8 may be encapsulated within IPv6.

Advantages of the present invention may include one or more of the following. In some embodiments, the present invention allows a Supernet to support a one-to-many relationship without the need for additional modifications to the existing packet transport mechanisms. In some embodiments, the present inventions allows the security context to remain embedded within the packet, thus security information is not exposed during transfer between nodes in a Supernet. Further, by embedding the security context, the encryption method is secure from capture. In some embodiments, the present invention provides functionality to support group-wise secrecy without modifying the existing packet transport mechanisms. Those skilled in the art will appreciate that the present invention may have further advantages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conveying a security context, comprising:
obtaining a virtual address associated with a process executing on a recipient computer system;
issuing a first Internet Protocol version compliant packet, comprising:
invoking a Supernet Attach Command on an authentication server daemon;
receiving, in response to the Supernet Attach Command, Supernet configuration information comprising the security context; and
registering a mapping of the Supernet configuration information with a virtual address daemon,
wherein the first Internet Protocol version compliant packet comprises a first Internet Protocol version compliant header,
wherein the first Internet Protocol version compliant header comprises the security context,
wherein the security context comprises a Supernet identifier, a Channel identifier, and the virtual address, and
wherein data in a payload of the first Internet Protocol version compliant packet is encrypted using the Supernet identifier and the Channel identifier to obtain an encrypted payload;
issuing a second Internet Protocol version compliant packet, wherein the second Internet Protocol version compliant packet comprises a second Internet Protocol version compliant header,
wherein the second Internet Protocol version compliant header comprises a second Internet Protocol version compliant address of the recipient computer system,
wherein a payload of the second Internet Protocol version compliant packet comprises the first Internet Protocol version compliant packet, and
wherein the first Internet Protocol version is different from the second Internet Protocol version; and
forwarding the second Internet Protocol version compliant packet to the recipient computer system, wherein the security context is used by the recipient computer to decrypt the encrypted payload.

2. The method of claim 1, wherein the first Internet Protocol version compliant packet is Internet Protocol version 6 compliant packet.

3. The method of claim 1, wherein the second Internet Protocol version compliant packet is Internet Protocol version 4 compliant packet.

4. The method of claim 1, wherein the security context comprises a 128 bit unique value.

5. The method of claim 4, wherein the 128 bit unique value comprises a 16 bit set and a 112 bit set.

6. The method of claim 5, wherein the 16 bit set denotes a site local Internet protocol address comprising 12 bits for an address prefix followed by 4 bits for a zero value.

7. The method of claim 5, wherein the 112 bit set comprises contiguous bits for the Supernet identifier, the Channel identifier, and the virtual address.

8. The method of claim 5, wherein the 112 bit set comprises a 64 bit Supernet identifier, a 24 bit Channel identifier, and a 24 bit virtual address.

9. The method of claim 1, wherein the virtual address daemon maps the virtual address of the recipient process within the Supernet to an actual Internet protocol address.

10. A method for processing a security context, comprising:
receiving a first Internet Protocol version compliant packet comprising a first Internet Protocol version compliant header and a first Internet Protocol version compliant payload,
wherein the first Internet Protocol version compliant payload comprises a second Internet Protocol version compliant packet,
wherein the second Internet Protocol version compliant packet comprises encrypted data and a second Internet Protocol version compliant header comprising the security context, and
wherein the security context comprises a 128 bit unique value, wherein the 128 bit unique value comprises a 16 bit set and a 112 bit set, wherein the 112 bit set comprises contiguous bits for a virtual address, a Supernet identifier, and a Channel identifier;
extracting the encrypted data and the security context from the second Internet Protocol version compliant packet;
decrypting the encrypted data, by a recipient computer system, using the Supernet identifier and Channel identifier to obtain decrypted data; and
routing the decrypted data to a process in the recipient computer system using the virtual address,
wherein the first Internet Protocol version compliant header comprises a first Internet Protocol version compliant address used to route the first Internet Protocol version compliant packet to the recipient computer system.

11. The method of claim 10, wherein the 16 bit set denotes a site local Internet protocol address comprising 12 bits for an address prefix followed by 4 bits for a zero value.

12. The method of claim 10, wherein the 112 bit set comprises a 64 bit Supernet identifier, a 24 bit Channel identifier, and a 24 bit virtual address.

13. The method of claim 10, wherein the security context is obtained from the second Internet Protocol version compliant packet using a handler mechanism.

14. The method of claim 13, wherein the handler mechanism is a Netfilter.

* * * * *